(12) United States Patent
Chiba

(10) Patent No.: US 11,646,542 B2
(45) Date of Patent: May 9, 2023

(54) LASER OSCILLATOR PROVIDED WITH HEATING SUPPRESSION FUNCTION FOR HOUSING

(71) Applicant: Fanuc Corporation, Yamanashi (JP)

(72) Inventor: Tetsuya Chiba, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 199 days.

(21) Appl. No.: 16/749,420

(22) Filed: Jan. 22, 2020

(65) Prior Publication Data

US 2020/0251871 A1 Aug. 6, 2020

(30) Foreign Application Priority Data

Feb. 1, 2019 (JP) .............................. JP2019-017132

(51) Int. Cl.
*H01S 3/04* (2006.01)
*H01S 3/067* (2006.01)

(52) U.S. Cl.
CPC .............. *H01S 3/0405* (2013.01); *H01S 3/04* (2013.01); *H01S 3/0407* (2013.01); *H01S 3/06704* (2013.01)

(58) Field of Classification Search
CPC .... H01S 3/0405; H01S 3/0407; H01S 3/0404; H01S 3/06704; H01S 3/067; G02B 6/4256; G02B 6/4266; G02B 6/4268–4272; G02B 6/4289; G02B 6/4296; G02B 6/4201; G02B 6/4257; G02B 6/426; G02B 6/266
See application file for complete search history.

(56) References Cited

U.S. PATENT DOCUMENTS

| 8,027,555 B1 | 9/2011 | Kliner et al. |
| 2007/0206909 A1 | 9/2007 | Wetter et al. |
| 2014/0211818 A1 | 7/2014 | Hou et al. |
| 2016/0181762 A1* | 6/2016 | Dawson .................. G02B 6/42 372/6 |

FOREIGN PATENT DOCUMENTS

| CN | 104297841 | * | 1/2015 | .......... G02B 6/4298 |
| JP | 2007149932 A | | 6/2007 | |
| JP | 2008187100 A | | 8/2008 | |
| JP | 2008310277 A | | 12/2008 | |
| JP | 2009115918 A | | 5/2009 | |
| JP | 2009116076 A | | 5/2009 | |
| JP | 2010238709 A | | 10/2010 | |
| JP | 5206733 B2 | | 6/2013 | |
| JP | 6109321 B2 | | 4/2017 | |
| JP | 6215860 B2 | | 10/2017 | |

OTHER PUBLICATIONS

Li, Qi et al. CN-104345387-A, Feb. 2015 (Year: 2015).*

* cited by examiner

*Primary Examiner* — Tod T Van Roy
*Assistant Examiner* — Delma R Fordé
(74) *Attorney, Agent, or Firm* — RatnerPrestia

(57) ABSTRACT

A laser oscillator includes a housing, an optical fiber disposed in the housing and including a fused portion or a curved portion, an optical absorber positioned between the housing and the fused portion or the curved portion and configured to absorb leakage light from the optical fiber, a thermally conductive support column configured to support the optical absorber, and a cooling unit configured to cool the optical absorber via the thermally conductive support column.

6 Claims, 4 Drawing Sheets

LASER OSCILLATOR PROVIDED WITH HEATING SUPPRESSION FUNCTION FOR HOUSING

CROSS-REFERENCE TO RELATED APPLICATIONS

This application is a new U.S. Patent Application that claims benefit of Japanese Patent Application No. 2019-017132, dated Feb. 1, 2019, the disclosure of this application is being incorporated herein by reference in its entirety for all purposes.

BACKGROUND OF THE INVENTION

1. Field of the Invention

The present invention relates to a laser oscillator, and more particularly to a laser oscillator provided with a heating suppression function for a housing.

2. Description of the Related Art

When an optical fiber is used in a laser oscillator, it is known that leakage light is generated from a slight positional shift in the fused portion of the optical fiber or a curved portion of the laid optical fiber. As a related art for solving various problems caused by such leakage light, the following documents are known.

JP 6109321 B discloses a semiconductor laser module in which an optical absorber is provided on the outer periphery of a glass capillary through which an optical fiber is inserted. Thus, the adhesive configured to fix the optical fiber and the covering portion of the optical fiber are prevented from being damaged by heat generated due to light absorption.

JP 6215860 B discloses a light absorber including a first light absorber which partially absorbs and reflects light, and a second light absorber which partially absorbs light reflected by the first light absorber and reflects the light toward the first light absorber, where ends of the first light absorber and the second light absorber positioned downstream in the direction of travel of light are bonded to each other. The optical absorber further includes a cooling unit disposed on at least one of the first optical absorber and the second optical absorber, and a connecting member configured to connect the first optical absorber and the second optical absorber to each other. As a result, heat generation of the first light absorber and the second light absorber is suppressed by the cooling unit via the connecting member.

JP 2008-310277 A discloses an optical fiber fusion splicing structure in which a fused portion between a double clad fiber and a single clad fiber is covered with a black alumite treated aluminum block. Most of the excitation light emitted from the fused portion is absorbed by the black alumite layer and heat is dissipated to the aluminum block.

JP 5206733 B discloses that a heat amount, applied to a wafer by applying a reflective material or an absorbent material in a state where a convex portion existing on a surface of the wafer is exposed, is absorbed by the reflective material or the absorbent material, and a modified layer formed by the heat amount is formed shallow from the surface of the wafer.

JP 2009-116076 A discloses an optical fiber fused portion holding structure, which is provided, in an outer peripheral portion of an optical fiber fused portion where a cover of the optical fiber ends are removed and the optical fibers are fusion spliced together and a cover removal portion where the cover has been removed, with a light absorbing portion that absorbs light transmitted through an optical fiber through a space, and the light absorbing portion is attached with a heat sink.

SUMMARY OF THE INVENTION

FIG. 8 is a partial cross-sectional view of a laser oscillator 8 according to the related art. The leakage light 82 from a fused portion 80a (or a curved portion) of an optical fiber 80 is irradiated to the housing 81 of the laser oscillator 8, and the housing 81 that has absorbed the leakage light 82 is heated. At times, the housing 81 becomes a high-temperature body exceeding 100°, and becomes a dangerous source. Since the laser oscillator 8 includes a plurality of units, there is also a risk of increasing the temperature of the surrounding units.

Therefore, there is a need for a technique with a simple configuration that suppresses the housing of the laser oscillator being heated by the leakage light from the optical fiber.

An aspect of the present disclosure provides a laser oscillator including a housing, an optical fiber disposed in the housing and including a fused portion or a curved portion, an optical absorber positioned between the housing and the fused portion or the curved portion and configured to absorb leakage light from the optical fiber, a thermally conductive support column configured to support the optical absorber, and a cooling unit configured to cool the optical absorber via the thermally conductive support column.

Another aspect of the present disclosure provides a laser oscillator including a housing, an optical fiber disposed in the housing and including a fused portion or a curved portion, a reflective material positioned between the housing and the fused portion or the curved portion and configured to reflect leakage light from the optical fiber, an optical absorber configured to absorb reflected light from the reflective material, and a cooling unit being in contact with the optical absorber and configured to cool the optical absorber.

Another aspect of the present disclosure provides a laser oscillator including a housing, an optical fiber disposed in the housing and including a fused portion or a curved portion, an optical absorber configured to cover at least the fused portion or the curved portion and absorb leakage light from the optical fiber by having a refractive index higher than a refractive index of a clad of the optical fiber and higher than a refractive index of the air, and a cooling unit being in contact with the optical absorber and configured to cool the optical absorber.

DETAILED DESCRIPTION

Figure 1:
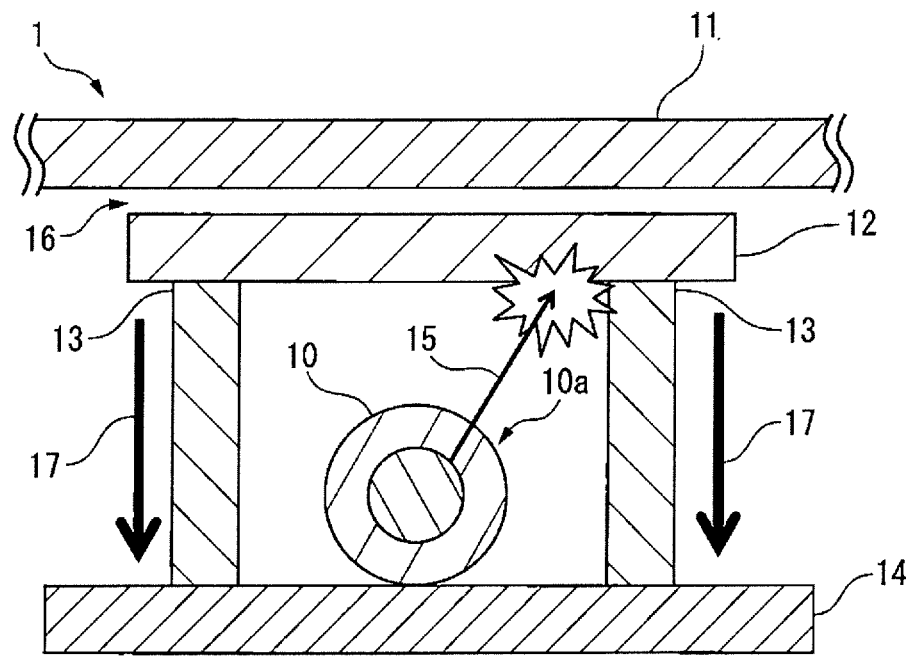
FIG. 1 is a partial cross-sectional view of a laser oscillator according to a first embodiment.

Embodiments of the present disclosure will be described below in detail with reference to the accompanying drawings. In each drawing, the same or similar components are designated by the same or similar reference numerals. Furthermore, the embodiments described below do not limit the technical scope of the invention and the meaning of the terms described in the claims.

Figure 8:
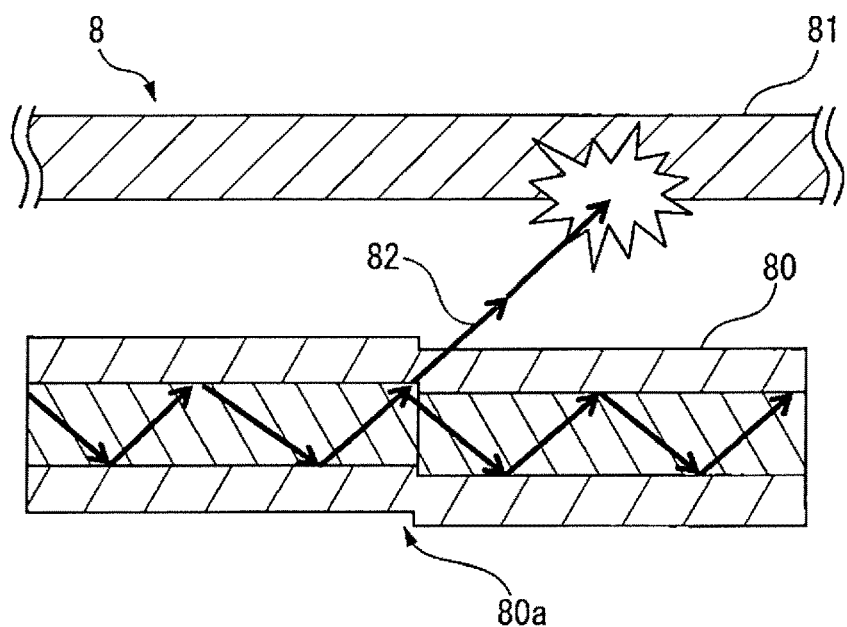
FIG. 8 is a partial cross-sectional view of a laser oscillator according to the related art.

FIG. 1 is a partial cross-sectional view of a laser oscillator 1 according to a first embodiment. A laser oscillator 1 is provided with an optical fiber 10, a housing 11, an optical absorber 12, a thermally conductive support column 13, and a cooling unit 14. The optical fiber 10 is disposed within the housing 11 and includes a fused or curved portion 10a (See FIG. 8). The optical fiber 10 is in contact with the cooling unit 14, and the cooling unit 14 cools the optical fiber 10. As a result, heat of the optical fiber 10 generated by the laser light passing through the inside of the optical fiber 10 is discharged.

The optical absorber 12 is formed of a material having a high thermal conductivity, for example, copper, aluminum, iron, or the like, in a plate shape, a U-shape, or the like. The thermal conductivity of the optical absorber 12 is preferably, for example, 50 W/m·K or more. The inward surface of the optical absorber 12 facing the optical fiber 10 is subjected to a surface treatment configured to increase the light absorption rate, such as black plating, black alumite treatment, quenching, or black coating. The optical absorber 12 is positioned between the housing 11 and the fused portion or the curved portion 10a of the optical fiber 10 and absorbs the leakage light 15 from the fused portion or the curved portion 10a. Preferably, a gap 16 of at least 1 mm or more is provided between the housing 11 and the optical absorber 12. This further suppresses heating of the housing 11.

The thermally conductive support column 13 supports the optical absorber 12. The thermally conductive support column 13 also conducts heat of the optical absorber 12, generated by absorption of the leakage light 15, to the cooling unit 14, as indicated by the heat discharging direction 17. The thermally conductive support column 13 is preferably formed of the same material as the optical absorber 12, thereby reducing thermal resistance at the contact interface between the thermally conductive support column 13 and the optical absorber 12.

The cooling unit 14 is constituted by a cooling device such as a water-cooling type or an air-cooling type, and for example, an existing chiller or a known heat sink, or the like can be used. The cooling unit 14 includes a cooling plate formed of a material having a high thermal conductivity, for example, copper, aluminum, iron, or the like, in a plate shape or a U-shape, or the like, and the cooling plate is disposed at a position facing the optical absorber 12 with locating the optical fiber 10 between the cooling plate and the optical absorber 12. The cooling unit 14 not only cools the optical fiber 10, but also cools the optical absorber 12 via the thermally conductive support column 13. As a result, heat of the optical absorber 12 generated by absorption of the leakage light 15 is discharged.

Figure 2:
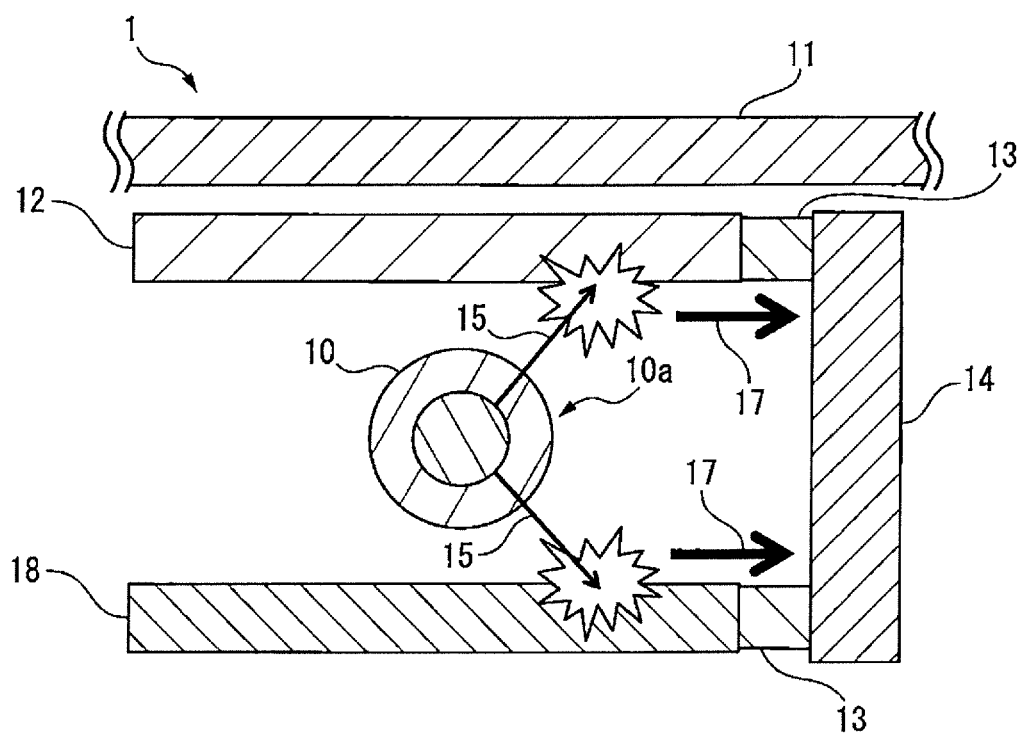
FIG. 2 is a partial cross-sectional view illustrating a modification of a laser oscillator.

FIG. 2 is a partial cross-sectional view illustrating a modification of the laser oscillator 1. The laser oscillator 1 according to the present example further includes another optical absorber 18 formed of the same material as the optical absorber 12 in a plate shape, a U-shape, or the like. The optical absorber 18 is disposed to surround the optical fiber 10 together with the optical absorber 12. The optical absorber 18 absorbs the leakage light 15 that cannot be completely covered by the optical absorber 12, and further suppresses the heating of the housing. The optical absorber 18, like the optical absorber 12, is supported by a thermally conductive support column 13. The thermally conductive support column 13 conducts heat of the two optical absorbers 12 and 18, generated by absorption of the leakage light 15, to the cooling unit 14. The cooling unit 14 cools the two optical absorbers 12 and 18 via the thermally conductive support columns 13.

Figure 3:
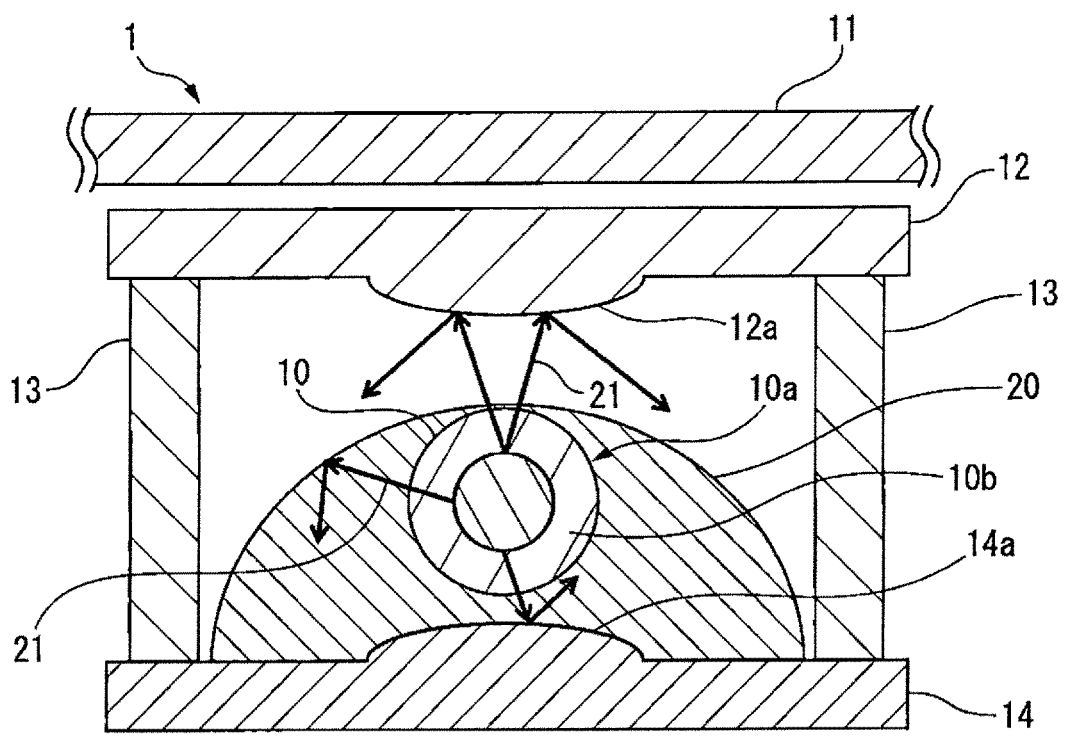
FIG. 3 is a partial cross-sectional view illustrating another modification of a laser oscillator.

FIG. 3 is a partial cross-sectional view illustrating another modification of the laser oscillator 1. The laser oscillator 1 according to the present example further includes a high refractive index resin 20 configured to fix the optical fiber 10 to the cooling unit 14. The high refractive index resin 20 has a refractive index higher than a refractive index of the clad 10b of the optical fiber 10 and higher than a refractive index of the air. As a result, not only the leakage light from the fused portion or the curved portion 10a of the optical fiber 10, but also the laser light 21 passing through the inside of the clad 10b is easily transmitted to the high refractive index resin 20, and further, it is easily reflected at the interface between the high refractive index resin 20 and the air. That is, the laser light 21 is confined in the high refractive index resin 20. This suppresses not only the heating of the optical fiber 10 but also the heating of the housing 11. The high refractive index resin 20 fixes the optical fiber 10 to the cooling unit 14, and thus the high refractive index resin 20 is also in contact with the cooling unit 14. The cooling unit 14 cools the high refractive index resin 20.

Further, it is preferable that circular portions 12a and 14a are respectively provided on the inward surfaces of the optical absorber 12 and the cooling unit 14 facing the optical fiber 10. The circular portions 12a and 14a are formed in semicircular, semi-elliptical or the like, along the optical fiber 10. This makes it difficult for the laser light 21 reflected or radiated by the circular portions 12a and 14a to return to the optical fiber 10, thereby suppressing secondary heating of the optical fiber 10. As an alternative example, polygonal portions may be provided instead of circular portions 12a and 14a. Examples of the polygonal portion include a triangle, a half hexagon, or the like, formed along the optical fiber 10.

Figure 4:
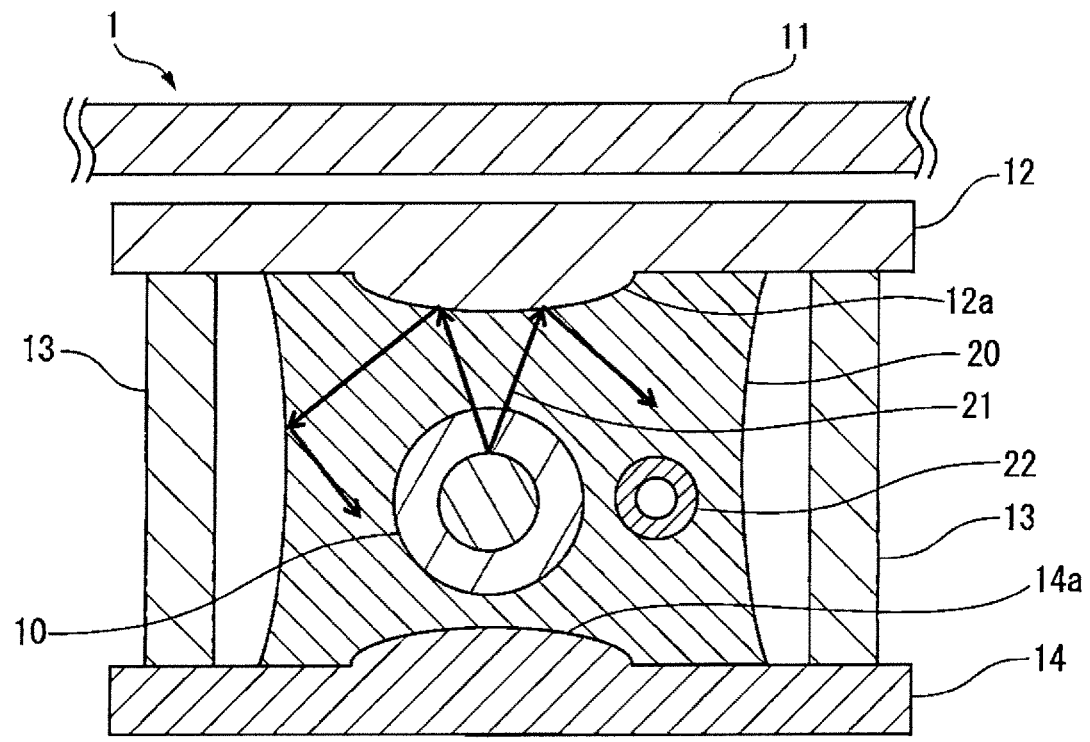
FIG. 4 is a partial cross-sectional view illustrating yet another modification of a laser oscillator.

FIG. 4 is a partial cross-sectional view illustrating another modification of the laser oscillator 1. The high refractive index resin 20 according to the present example is not only in contact with the cooling unit 14 but also in contact with the optical absorber 12. Thus, the laser light 21 passing through the inside of the high refractive index resin 20 is easily absorbed by the optical absorber 12, and the heating of the high refractive index resin 20 by the laser light 21 is suppressed.

The laser oscillator 1 may further include a refrigerant tube 22. The refrigerant tube 22 is formed in a tubular shape, and formed of a material having a high thermal conductivity, for example, copper, aluminum, iron, or the like, or a resin containing a filler having a high thermal conductivity, or the like. The refrigerant tube 22 is disposed in the high refractive index resin 20 along the optical fiber 10, and a refrigerant such as water, ammonia, carbon dioxide, and hydrocarbon flows through the refrigerant tube 22. As a result, heat of the high refractive index resin 20 generated by absorption of the laser light 21 is further discharged.

Figure 5:
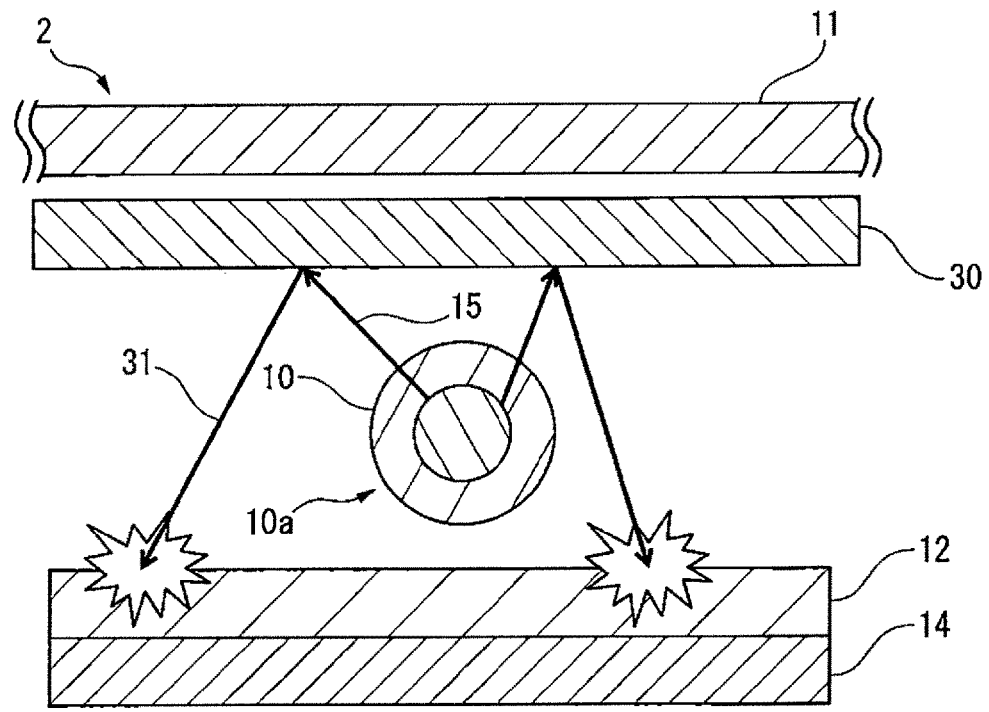
FIG. 5 is a partial cross-sectional view of a laser oscillator according to a second embodiment.

FIG. 5 is a partial cross-sectional view of the laser oscillator 2 according to a second embodiment. The laser oscillator 2 according to the present embodiment includes an optical fiber 10, a housing 11, an optical absorber 12, a cooling unit 14, and a reflective material 30. The reflective material 30 is formed of mirror-finished glass, aluminum, stainless steel, or the like. The reflective material 30 is positioned between the housing 11 and the fused portion or the curved portion 10a of the optical fiber 10 and reflects the leakage light 15 from the fused portion or the curved portion 10a toward the optical absorber 12. In order to absorb the reflected light 31 from the reflective material 30, the optical absorber 12 is preferably disposed at a position facing the reflective material 30 with locating the optical fiber 10 between the optical absorber 12 and the reflective material 30. As a result, heating of the housing 11 is suppressed. Further, since the optical absorber 12 is in contact with the cooling unit 14, and the cooling unit 14 cools the optical absorber 12, heat of the optical absorber 12 generated by absorption of the reflected light 31 is discharged.

Figure 6:
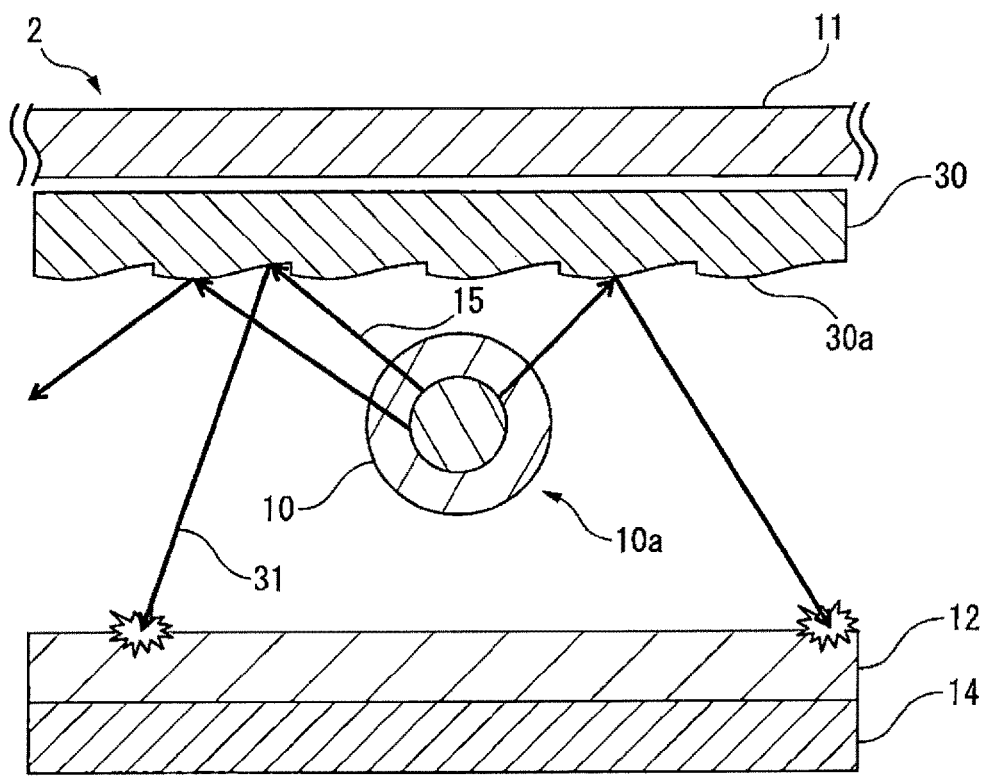
FIG. 6 is a partial cross-sectional view illustrating a modification of a laser oscillator.

FIG. 6 is a partial cross-sectional view illustrating a modification of the laser oscillator 2. The reflective material 30 according to the present example includes an uneven portion 30a on an inward surface facing the optical fiber 10. The uneven portion 30a reflects the leakage light 15 from the optical fiber 10 in a random direction, and suppresses the concentration of the leakage light 15 on a part of the housing 11. As a result, the concentrated heating of the housing 11 is suppressed.

Figure 7:
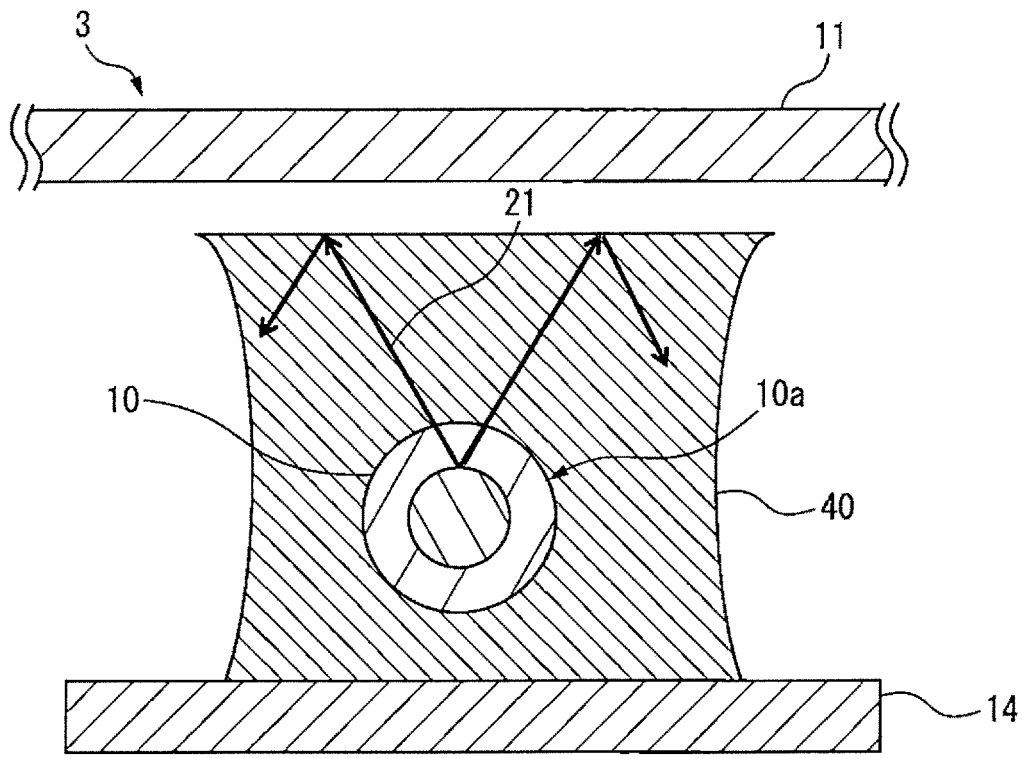
FIG. 7 is a partial cross-sectional view of a laser oscillator according to a third embodiment.

FIG. 7 is a partial cross-sectional view of a laser oscillator 3 according to a third embodiment. The laser oscillator 3 according to the present embodiment includes an optical fiber 10, a housing 11, a cooling unit 14, and an optical absorber 40. The optical absorber 40 covers at least the fused portion or the curved portion 10a of the optical fiber 10. The optical absorber 40 is made of, for example, a transparent resin or the like, and has a refractive index higher than a refractive index of the clad 10b of the optical fiber 10 and higher than a refractive index of the air. As a result, the laser light 21 passing through the inside of the clad 10b is generally transmitted from the clad 10b to the optical absorber 40, and is more easily reflected at the interface between the optical absorber 40 and the air. That is, the laser light 21 is confined within the optical absorber 40. Further, in order to suppress the heating of the housing 11, it is desirable to provide a gap of, for example, 1 mm or more between the housing 11 and the optical absorber 40. Further, the optical absorber 40 is in contact with the cooling unit 14, and the cooling unit 14 cools the optical absorber 40. As a result, heat of the optical absorber 40 generated by absorption of the laser light 21 is discharged.

According to the above embodiments, heating of the housing of the laser oscillator by the leakage light 15 from the optical fiber 10 is suppressed by the simple configuration.

While various embodiments have been described herein, it should be appreciated that the present invention is not limited to the embodiments described above, and that various modifications can be made within the scope of the following claims.

The invention claimed is:

1. A laser oscillator comprising:
a housing;
an optical fiber disposed in the housing and including a fused portion or a curved portion;
an optical absorber positioned between the housing and the fused portion or the curved portion and configured to absorb leakage light from the optical fiber;
a thermally conductive support column configured to support the optical absorber; and
a cooling unit configured to cool the optical absorber via the thermally conductive support column,
wherein the optical fiber is directly in contact with the cooling unit.

2. The laser oscillator of claim 1, wherein a gap is provided between the housing and the optical absorber.

3. A laser oscillator comprising:
a housing;
an optical fiber disposed in the housing and including a fused portion or a curved portion;
an optical absorber positioned between the housing and the fused portion or the curved portion and configured to absorb leakage light from the optical fiber;
a thermally conductive support column configured to support the optical absorber;
a cooling unit configured to cool the optical absorber via the thermally conductive support column; and
a high refractive index resin configured to fix the optical fiber to the cooling unit, wherein
the high refractive index resin has a refractive index higher than a refractive index of a clad of the optical fiber and higher than a refractive index of the air, and
the high refractive index resin is directly in contact with the cooling unit.

4. The laser oscillator of claim 3, wherein the high refractive index resin is in contact with the optical absorber.

5. The laser oscillator of claim 3, further comprising a refrigerant tube disposed along the optical fiber in the high refractive index resin.

6. A laser oscillator comprising:
a housing;
an optical fiber disposed in the housing and including a fused portion or a curved portion;
an optical absorber positioned between the housing and the fused portion or the curved portion and configured to absorb leakage light from the optical fiber;
a thermally conductive support column configured to support the optical absorber;
a cooling unit configured to cool the optical absorber via the thermally conductive support column; and
a high refractive index resin arranged in direct contact with the cooling unit,
wherein the optical absorber and the cooling unit include circular portions or polygonal portions on inward surfaces facing the optical fiber, and
wherein the thermally conductive support column is in direct contact on a first end with the optical absorber and direct contact on a second end with the cooling unit.

* * * * *